United States Patent
Branson et al.

(10) Patent No.: US 9,015,339 B2
(45) Date of Patent: Apr. 21, 2015

(54) MONITORING STREAMS BUFFERING TO OPTIMIZE OPERATOR PROCRESSING

(75) Inventors: Michael J. Branson, Rochester, MN (US); Ryan K. Cradick, Oronoco, MN (US); John M. Santosuosso, Rochester, MN (US); Brandon W. Schulz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/455,982

(22) Filed: Apr. 25, 2012

(65) Prior Publication Data

US 2013/0290394 A1 Oct. 31, 2013

(51) Int. Cl.
G06F 15/16 (2006.01)
H04L 29/08 (2006.01)
H04L 12/825 (2013.01)

(52) U.S. Cl.
CPC .............. *H04L 67/104* (2013.01); *H04L 47/25* (2013.01)

(58) Field of Classification Search
CPC ....................................................... H04L 47/25
USPC ......................................................... 709/234
See application file for complete search history.

(56) References Cited

U.S. PATENT DOCUMENTS

| | | | |
|---|---|---|---|
| 6,347,094 B1 * | 2/2002 | Gopalakrishnan | 370/464 |
| 6,389,587 B1 * | 5/2002 | Lewis | 717/151 |
| 7,437,397 B1 | 10/2008 | Koudas et al. | |
| 7,644,110 B2 * | 1/2010 | Nishizawa et al. | 709/231 |
| 7,783,655 B2 * | 8/2010 | Barabas et al. | 707/758 |
| 7,831,951 B2 * | 11/2010 | Catthoor et al. | 716/104 |
| 7,849,227 B2 | 12/2010 | Kashiyama et al. | |
| 8,059,546 B2 * | 11/2011 | Pai et al. | 370/236 |
| 8,291,005 B2 * | 10/2012 | Lang et al. | 709/201 |
| 2010/0293532 A1 * | 11/2010 | Andrade et al. | 717/140 |
| 2011/0016469 A1 | 1/2011 | Klein | |
| 2013/0290489 A1 * | 10/2013 | Branson et al. | 709/219 |

\* cited by examiner

*Primary Examiner* — Lance L Barry
(74) *Attorney, Agent, or Firm* — Patterson & Sheridan, LLP

(57) ABSTRACT

Method, system and computer program product for performing an operation, including providing a plurality of processing elements comprising one or more operators, the operators configured to process streaming data tuples, establishing an operator graph of multiple operators, the operator graph defining at least one execution path in which a first operator is configured to receive data tuples from at least one upstream operator and transmit data tuples to at least one downstream operator, providing each operator a buffer configured to hold data tuples requiring processing receiving a plurality of data tuples in a buffer associated with an operator, the data tuples comprising at least one attribute, determining a backlog exists in the first buffer, selecting at least one data tuple from the first buffer, examining an attribute of the selected data tuples to identify a candidate tuple, and performing a second operation on the candidate tuple.

19 Claims, 8 Drawing Sheets

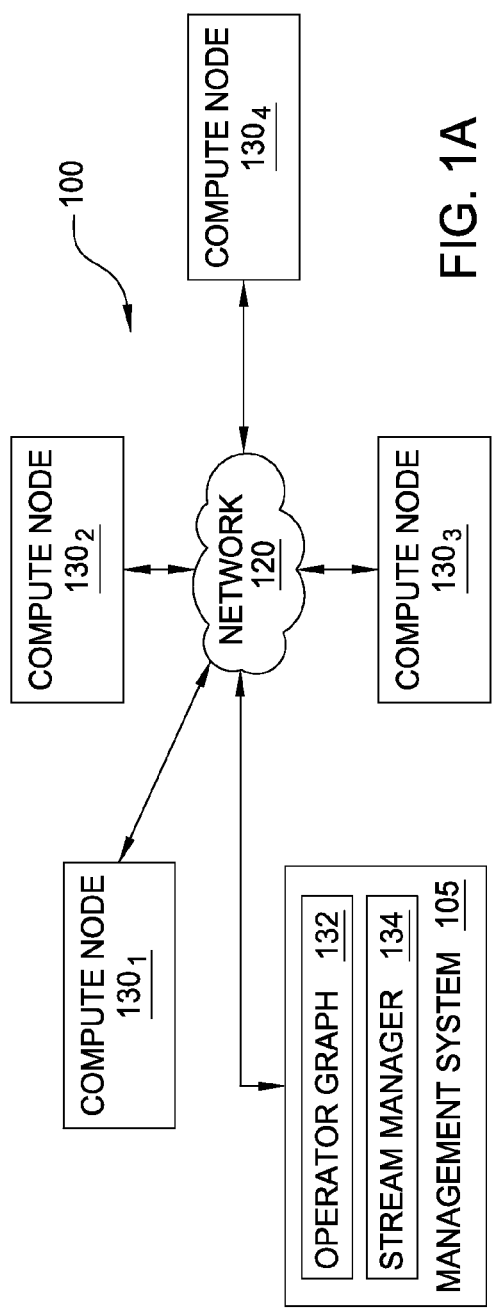
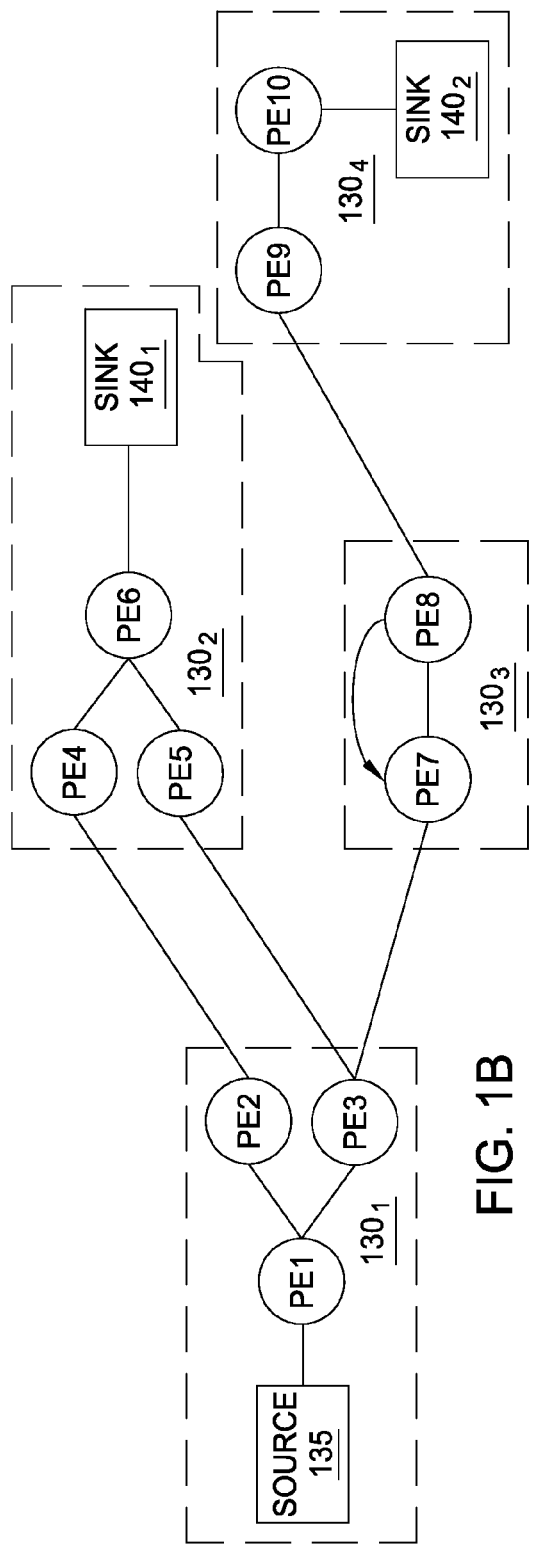
FIG. 1A
FIG. 1B

| | |
|---|---|
| Tuples in Operator Buffer Prior to Operation (820) | {PID = 100, Days = 10, PointsEarned = 100.5, Active = 1}, {PID = 101, Days = 0, PointsEarned = 0, Active = 1}, {PID = 200, Days = 92, PointsEarned = .001, Active = 1}, {PID = 102, Days = 91, PointsEarned = 2, Active = 1}, {PID = 107, Days = 15, PointsEarned = 5, Active = 0}, {PID = 104, Days = 5, PointsEarned = 3, Active =1}, and {PID = 100, Days = 10, PointsEarned = 100.5, Active = 1} |
| Tuples in Operator Buffer After Removal Operation (825) | {PID = 100, Days = 10, PointsEarned = 100.5}, {PID = 102, Days = 91, PointsEarned = 2}, {PID = 104, Days = 5, PointsEarned = 3} |
| Tuples in Operator Buffer After Tuple Sorting (830) | {PID = 100, Days = 10, PointsEarned = 100.5}, {PID = 100, Days = 10, Points Earned = 100.5}, {PID = 101, Days = 0, PointsEarned = 0}, {PID = 102, Days = 91, PointsEarned = 2}, {PID = 104, Days = 5, PointsEarned = 3}, {PID = 107}, {PID = 200, Days = 92, PointsEarned = .001} |

FIG. 8

MONITORING STREAMS BUFFERING TO OPTIMIZE OPERATOR PROCRESSING

BACKGROUND

Embodiments of the present disclosure generally relate to stream computing applications. Specifically, the embodiments disclose techniques for monitoring streams buffering to optimize operator processing in a streams computing environment.

SUMMARY

Embodiments disclosed herein provide a method, system and computer program product for performing an operation, the operation including providing a plurality of processing elements comprising one or more operators, the operators configured to process streaming data tuples. The operation establishes an operator graph of multiple operators, the operator graph defining at least one execution path in which a first operator of the plurality of operators is configured to receive data tuples from at least one upstream operator and transmit data tuples to at least one downstream operator. Each of the plurality of operators is provided a buffer configured to hold data tuples requiring processing by the respective operator, wherein the buffer is a first-in-first-out buffer. A plurality of data tuples are received in a first buffer associated with a first operator, the data tuples containing at least one attribute. The operation then selects at least one data tuple from the first buffer, and examines an attribute of the selected data tuples to identify at least one candidate tuple. The operation then performs a second operation on the at least one candidate tuple.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 1A-1B illustrate a computing infrastructure configured to execute a stream computing application, according to embodiments disclosed herein.

FIG. 8 illustrates a table depicting the contents of an operator buffer, according to one embodiment described herein.

DETAILED DESCRIPTION

Figure 2:
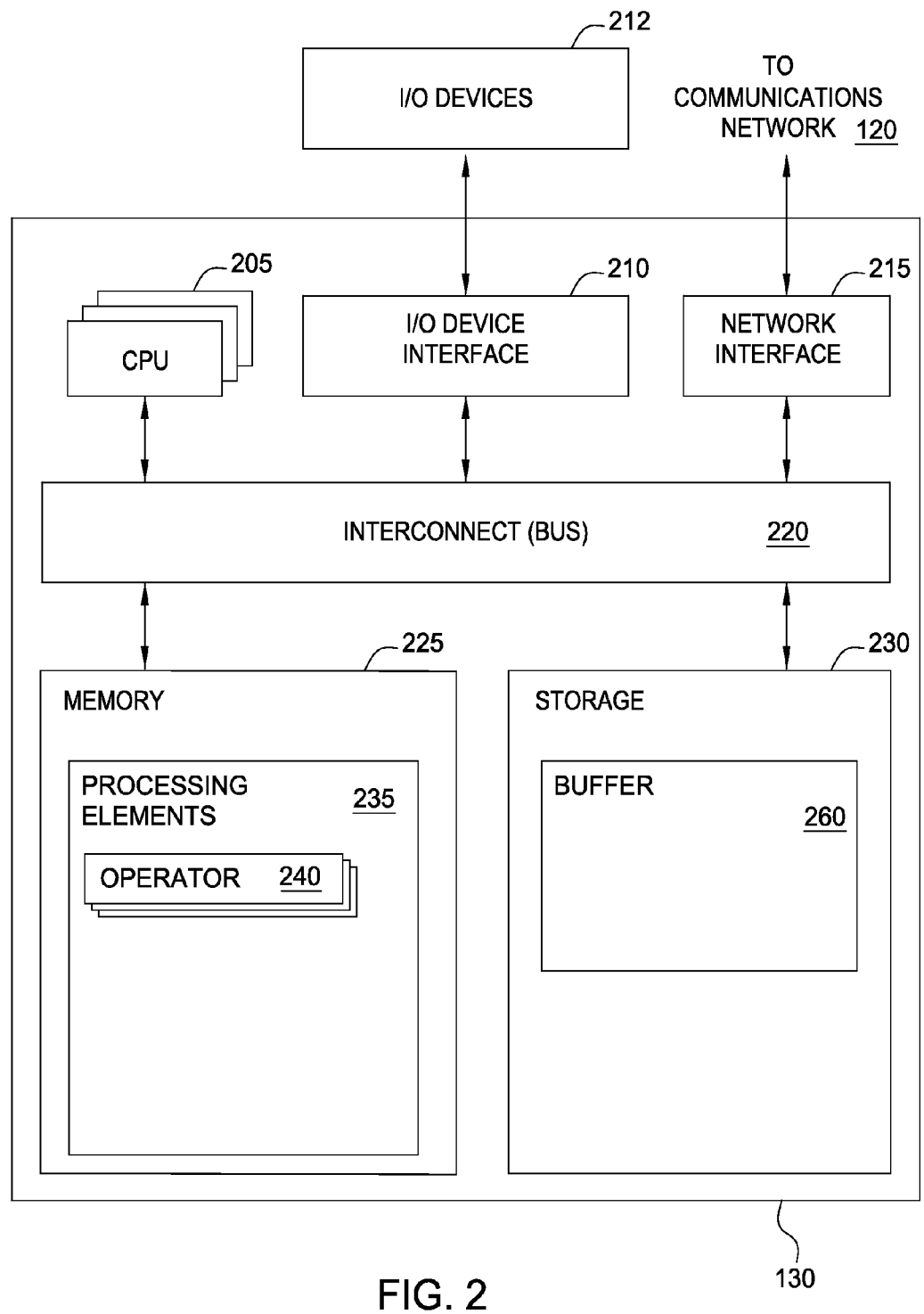
FIG. 2 is a more detailed view of the compute node of FIGS. 1A-1B, according to one embodiment disclosed herein.

Embodiments disclosed herein provide a method, system and computer program product for performing an operation, the operation including providing a plurality of processing elements comprising one or more operators, the operators configured to process streaming data tuples. The operation establishes an operator graph of multiple operators, the operator graph defining at least one execution path in which a first operator of the plurality of operators is configured to receive data tuples from at least one upstream operator and transmit data tuples to at least one downstream operator. Each of the plurality of operators is provided a buffer configured to hold data tuples requiring processing by the respective operator, wherein the buffer is a first-in-first-out buffer. A plurality of data tuples are received in a first buffer associated with a first operator, the data tuples containing at least one attribute. The operation then selects at least one data tuple from the first buffer, and examines an attribute of the selected data tuples to identify at least one candidate tuple. The operation then performs a second operation on the at least one candidate tuple.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating executables (i.e., processing elements), as well as replicating processing elements on multiple nodes and load balancing among them. Operators in a stream computing application can be fused together to form a processing element that is executable. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application.

In a streams application, an operator will preserve the set of tuples that it has not yet acted upon in a buffer. The tuples are, by default, acted upon in the order they arrive and are ordered in the buffer accordingly. As the operator executes, the next tuple in the buffer is processed by the operator. The number of tuples in a buffer fluctuates based upon a number of factors and can become large during normal operation. For example, a buffer may fill up based on the fluctuating workload of a node, from backpressure from downstream operators, or due to the nature of the operator, such as a join operator, which might wait for tuples sent from different streams. Embodiments disclosed herein improve performance of an operator by examining the contents of a buffer and taking actions to eliminate unnecessary processing when appropriate.

Embodiments disclosed herein examine the tuples in an operator's buffer to identify opportunities to improve performance. The basic case may involve a tuple later in the buffer which indicates that a subset of the tuples earlier in the buffer are stale and do not require processing. For example, if a tuple later in the buffer indicates that a user has ended an application session, tuples related to that session may be removed from the buffer. Alternatively, tuples may be reordered within the buffer when reordering may result in more efficient processing than removing tuples.

In the following, reference is made to embodiments of the disclosure. However, it should be understood that the invention is not limited to specific described embodiments. Instead, any combination of the following features and elements, whether related to different embodiments or not, is contemplated to implement and practice the disclosure. Furthermore, although embodiments of the invention may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

FIGS. 1A-1B illustrate a computing infrastructure configured to execute a stream computing application, according to one embodiment of the disclosure. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream computing application beginning from one or more operators in one or more source processing elements (PEs) through to one or more operators in one or more sink PEs. This flow from source to sink is also generally referred to herein as an execution path. Generally, data attributes flow into an operator of a source PE of a stream computing application and are processed by that operator. Typically, operators receive an N-tuple of data attributes from the stream as well as emit an N-tuple of data attributes into the stream (except for operators in a sink PE where the stream terminates). In general, a "tuple" is a single instance of a set of data attributes that follow the formatting of a schema, where the schema establishes a set of typed data attributes that may be used. For example, the tuple may be a chunk or portion of divisible data such as a data type (e.g., string, integer, Boolean, etc.) or combination of data types. In one embodiment, a "tuple" may include one or more attributes with an assigned value—e.g., Tuple 1: {sym="Fe", no=26} where "sym" and "no" are possible attributes in the schema (i.e., a string and integer, respectively) and "Fe" and "26" are the values.

Of course, the N-tuple received by an operator need not be the same N-tuple sent downstream. Additionally, operators could be configured to receive or emit tuples in other formats (e.g., the PEs or operators could exchange data marked up as XML documents). Furthermore, each operator within a PE may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the deployment of the operator graph 132. The stream manager 134 may move processing elements (PEs) from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements and operators (or what data tuples flow to the processing elements and operators) running on the compute nodes $130_{1-4}$. One example of a stream computing application is IBM®'s InfoSphere® Streams (InfoSphere® is a trademark of International Business Machines Corporation, registered in many jurisdictions worldwide).

FIG. 1B illustrates an example processing element graph that includes ten processing elements (labeled as PE1-PE10) running on the compute nodes $130_{1-4}$. A processing element is composed of one or more operators fused together into an independently running process with its own process ID (PID) and memory space. In cases where two (or more) processing elements are running independently, inter-process communication may occur using a "transport" (e.g., a network socket, a TCP/IP socket, or shared memory). However, when operators are fused together, the fused operators can use more rapid communication techniques for passing tuples among operators in each processing element.

As shown, the processing element graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into operators in the processing element PE1, which in turn emits tuples that are received by PE2 and PE3. For example, operators in PE1 may split data attributes received in a tuple and pass some data attributes to PE2, while passing other data attributes to PE3. Data that flows to PE2 is processed by the operators contained in PE2, and the resulting tuples are then emitted to the operators in PE4 on compute node $130_2$. Likewise, the data tuples emitted by the operators in PE4 flow to the operators sink PE6 $140_1$. Similarly, data tuples flowing from operators in PE3 to operators in PE5 also reach operators in sink PE6 $140_1$. Thus, in addition to being a sink for this example processing element graph, operators in PE6 could be configured to perform a join operation, combining tuples received from operators in PE4 and PE5. This example processing element graph also shows data tuples flowing from PE3 to PE7 on compute node $130_3$, which itself shows data tuples flowing to operators in PE8 and looping back to operators in PE7. Data tuples emitted from operators in PE8 flow to operators in PE9 on compute node $130_4$, which in turn emits tuples to be processed by operators in sink PE10 $140_2$.

Because a processing element is a collection of fused operators, it is equally correct to describe the processing element graph as execution paths between specific operators, which may include execution paths to different operators within the same processing element. FIG. 1B illustrates execution paths between processing elements for the sake of clarity.

FIG. 2 is a more detailed view of the compute node 130 of FIGS. 1A-1B, according to one embodiment disclosed herein. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. In one embodiment, a PE 235 is assigned to be executed by only one CPU 205 although in other embodiments the operators 240 of a PE 235 may comprise one or more threads that are executed on a plurality of CPUs 205. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235. Each PE 235 includes a collection of operators 240 that are fused together. As noted above, each operator 240 may provide a small chunk of code configured to process data flowing into a processing element (e.g., PE 235) and to emit data to other operators 240 in the same PE or to other PEs in the stream computing application. Such processing elements may be on the same compute node 130 or on other compute nodes that are accessible via communications network 120.

As shown, storage 230 contains a buffer 260. Although shown as being in storage, the buffer 260 may be located in the memory 225 of the compute node 130 or a combination of both. Moreover, storage 230 may include storage space that is external to the compute node 130.

Figure 3:
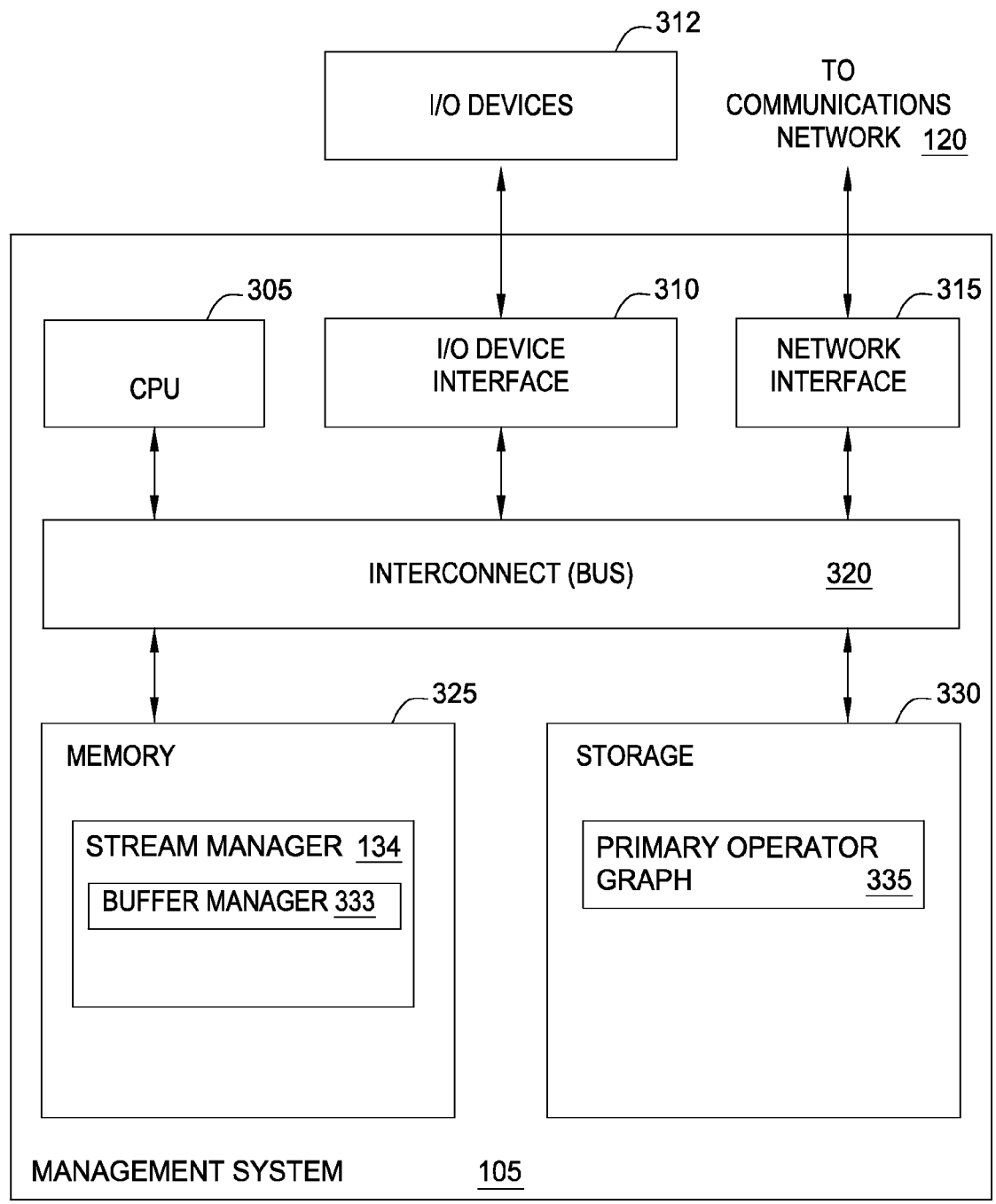
FIG. 3 is a more detailed view of the server management system of FIGS. 1A-1B, according to one embodiment disclosed herein.

FIG. 3 is a more detailed view of the server management system 105 of FIG. 1, according to one embodiment disclosed herein. As shown, server management system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 132. The stream manager 134 may use the primary operator graph 132 to route tuples to PEs 235 for processing. The stream manager 134 also includes buffer manager 333, the buffer manager 333 configured to analyze tuples in the buffer 260 to identify candidate tuples upon which operations can be performed to optimize operator processing. In some embodiments, the operation may include removing tuples from the buffer 260. In some embodiments, the operation may include reordering tuples within the buffer 260. By removing or reordering tuples from the buffer 260, the buffer manager 333 may reduce the backlog of tuples in the buffer 260, and help improve operator processing performance.

Figure 4:
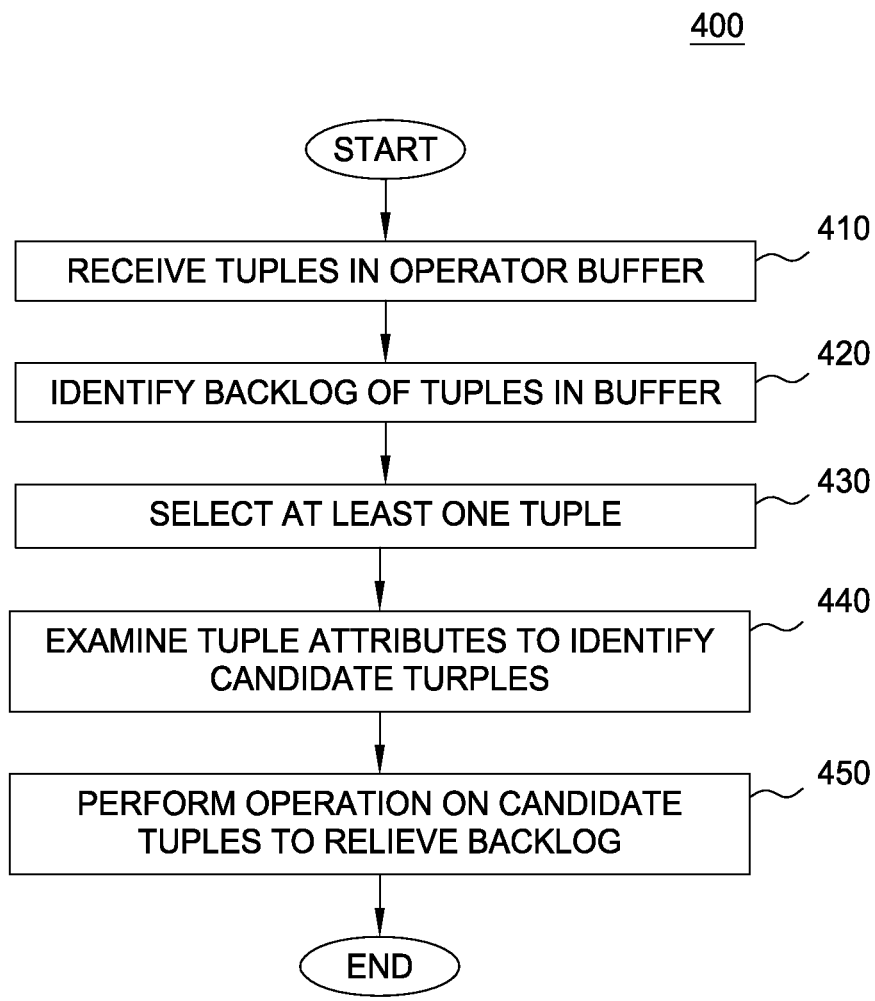
FIG. 4 is a flowchart depicting a method for monitoring streams buffering to optimize operator processing, according to one embodiment disclosed herein.

FIG. 4 is a flowchart depicting a method 400 for monitoring streams buffering to optimize operator processing, according to one embodiment disclosed herein. At step 410, tuples are received in the buffer 260 of an operator in the operator graph. As the streams application executes, tuples continue to arrive in the buffer 260. At step 420, the buffer manager 333 identifies a backlog of tuples in the buffer 260. A backlog may be identified by any number of means, but generally is defined to occur when the number of tuples in the buffer 260 exceeds a predefined threshold. Circumstances which indicate that there may be a buffer backlog include, but are not limited to: (i) when a downstream operator receives tuples at a rate lower than a predefined threshold; (ii) historical patterns which include specific times when a backlog repeatedly occurs, such as a reoccurring backlog at 2:00 AM on a Friday; (iii) resources used by the processing element or node, exceed a specified threshold, such as the processor running at 100% utilization, or reaching a memory usage limit; (iv) buffer throughput rates falling below a predefined threshold; and (v) when the current operator emits tuples at a rate lower than a predefined threshold. The buffer manager 333 may prioritize buffer optimization over other processes, and identify buffer backlogs by examining slower parts of the operator graph to determine what may be resolved. In some embodiments, there may exist a buffer on the output side of the operator, different from the buffer 260 at the input side of the operator. In these embodiments, the buffer manager 333 may apply the same monitoring, removal, and reordering techniques to the output buffer as it applies to the input buffer 260. Circumstances which indicate that the output buffer may be experiencing a backlog include, but are not limited to, the indicators as described above.

At step 430, the buffer manager 333 selects at least one tuple from the buffer 260 for examination. The buffer manager 333 may use any method to select tuples from the buffer 260, described in greater detail with reference to FIG. 5. At step 440, the buffer manager 333 examines attributes of the selected tuples to identify candidate tuples. A candidate tuple is a tuple that may not need processing, or may be processed at a later time, and can therefore be removed from or reordered within the buffer. In some embodiments, the buffer manager 333 may reference operator properties to determine which attributes to examine. In other embodiments, the buffer manager 333 may examine default attributes within each tuple. In still other embodiments, the buffer manager 333 may examine all tuple attributes. At step 450, the buffer manager 333 performs an operation on the candidate tuples to relieve the backlog of tuples in the buffer 260. As stated above, the tuples may be removed from the buffer 260, or may be reordered within the buffer 360, in order to relieve the backlog and improve operator processing. The additional processing needed for examining the buffer 260 may come from additional cycles available on the node running the operator, or from another source. In the case of backpressure, it is likely that operators that are forced to slow down their computation will have resources available to examine the buffer 260. By allocating computing resources in such a fashion, operation of the buffer manager 333 likely will not adversely affect operation of the streams computing application.

Figure 5:
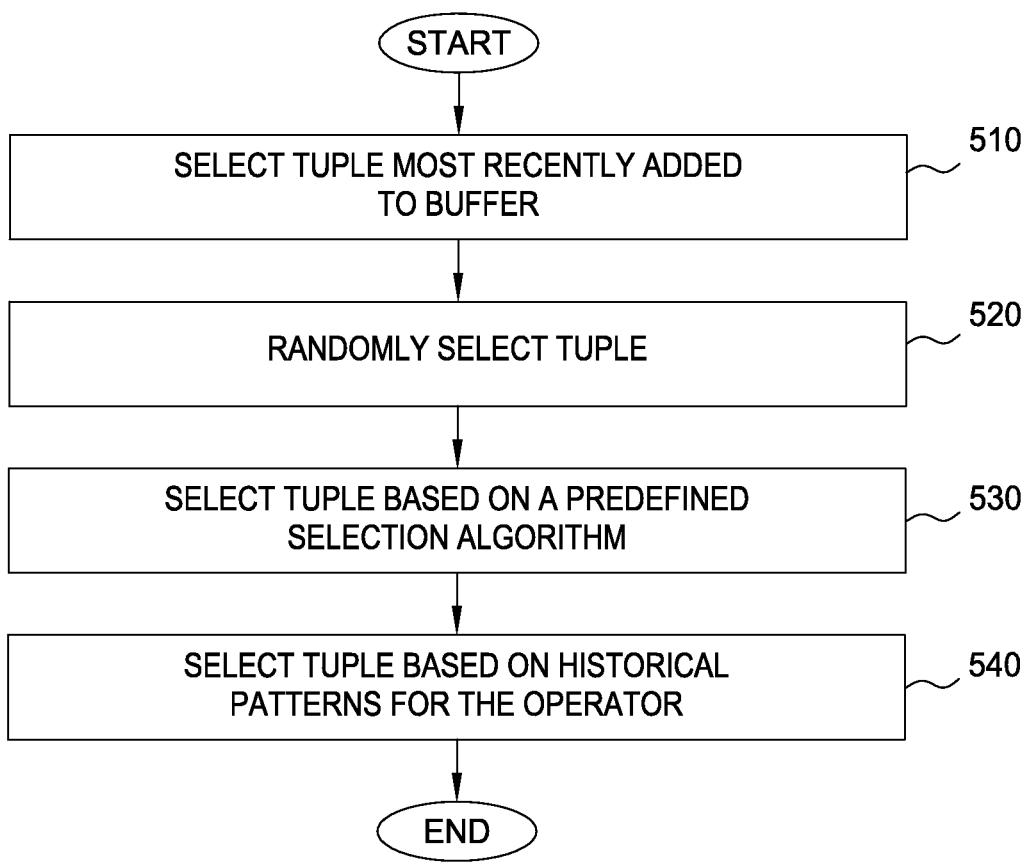
FIG. 5 is a flowchart depicting a method for selecting tuples in an operator buffer, according to one embodiment disclosed herein.

FIG. 5 is a flowchart depicting a method 500 corresponding to step 430 for selecting tuples in an operator buffer, according to one embodiment disclosed herein. Although depicted as a flowchart, the buffer manager may implement one, several, or all of the steps of the method 500 to select tuples from the operator buffer 260. In addition, the steps of the method 500 may be executed as many times as the buffer manager 333 determines is necessary to relieve the backlog of tuples in the buffer 260. For example, the buffer manager 333 may relieve the backlog by operating on a single tuple identified in the first pass of the method 500. In other cases, the buffer manager 333 may need to operate on additional tuples in the buffer 260 to relieve the backlog, requiring subsequent iterations of the method 500 to select tuples.

At step 510, the buffer manager 333 selects the tuple most recently added to the buffer 260. In such embodiments, the buffer manager 333 would be selecting the newest tuples in the buffer 360, which would be most likely to contain attributes indicating that the tuple is a candidate tuple. Subsequent iterations of the step 510 would have the buffer manager 333 select the next most recently added tuple to the buffer 260, and so on. For example, consider an application analyzing usage patterns for users of a web-based application in order to offer real-time promotions that are relevant to the actions they are performing in the application. During a period of high usage in the application, tuples may begin to back up in a buffer for one of the operators in the application. By examining the tuples in reverse order, the buffer manager 333 may determine that user X has ended their application session, which would indicate that any tuples in the buffer related to user X may be deemed irrelevant and deleted from the buffer, thus reducing the backlog that the operator is trying to catch up with. Because the tuple indicating the user has ended their application session are more likely to be located at the end of the buffer (and therefore are the most recently added), the buffer manager 333 may select tuples at the end of the buffer.

At step 520, the buffer manager 333 may randomly select a tuple. In subsequent iterations of step 520, the buffer manager 333 may continue to select tuples at random. At step 530, the buffer manager 333 may select tuples based on a predefined selection algorithm. Examples of predefined selection algorithms include, but are not limited to, selecting every $N^{th}$ tuple, every even tuple, every odd tuple, and so on. In subsequent iterations of step 530, the buffer manager 333 would select tuples based on the predefined selection algorithm. At step 540, the buffer manager 333 selects tuples based on historical patterns for the operator. For example, the operator properties may specify a pattern for selecting tuples that, upon being operated on, resulted in diminishing the backlog in the buffer 260. In such embodiments, the buffer manager 333 may store successful and unsuccessful patterns in a data structure associated with the operator, which would be the foundation of an intelligent tuple selection mechanism for the buffer manager 333.

Figure 6:
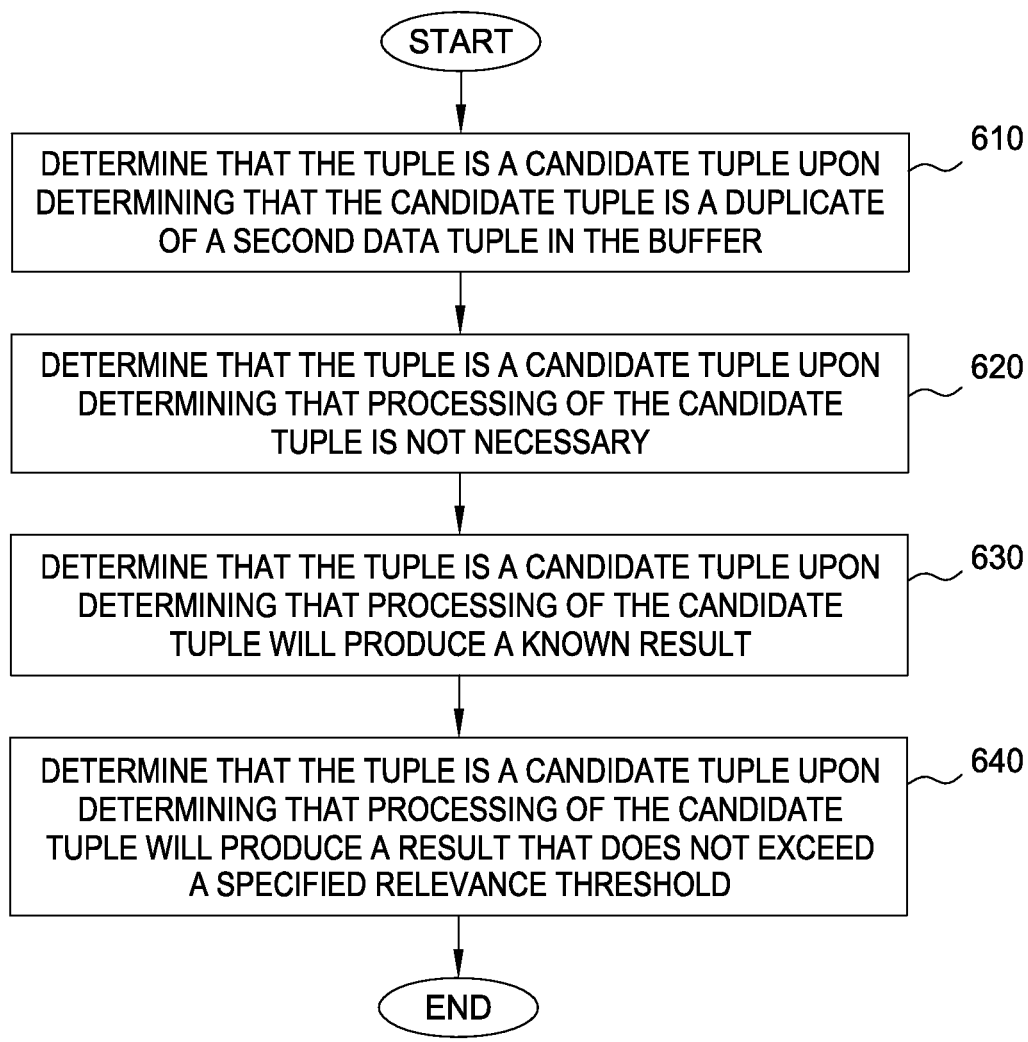
FIG. 6 is a flowchart depicting a method for identifying candidate tuples in an operator buffer, according to one embodiment disclosed herein.

FIG. 6 is a flowchart depicting a method 600 corresponding to step 440 for identifying candidate tuples in an operator buffer, according to one embodiment disclosed herein. In some embodiments, the buffer manager 333 examines attributes of tuples selected at step 430 to determine whether a predefined condition is satisfied as to the selected tuples, such that the selected tuples may be labeled as candidate tuples and further processed by the buffer manager 333 in order to improve operator performance. The key values of the attributes that would trigger the predefined condition may be specified by operator properties, or by the buffer manager 333. Although depicted as a flowchart, the buffer manager 333 may implement one, several, or all of the steps of the method 600 to identify candidate tuples in the buffer 260. At step 610, the buffer manager 333 determines that the predefined condition is satisfied upon determining that the candidate tuple is a duplicate of a second data tuple in the buffer 260. This determination may be made based on comparing tuple attributes to find duplicate values, or values that are close enough to be considered duplicates. Duplicate tuples may not need to be processed twice (or more, if many duplicates exist), and removal or reordering of the tuples would likely reduce the backlog in the buffer 260. Upon making such a determination, the buffer manager 333 may scan the remaining tuples in the buffer to identify other tuples having the same attribute as the duplicate tuple.

At step 620, the buffer manager 333 determines that the predefined condition is satisfied upon determining that processing of the candidate tuple is not necessary. Factors which may indicate that processing of the tuple is not necessary include, but are not limited to, application instances which have been terminated (e.g., a particular user has terminated a session, as described above). A tuple having a session identifier attribute matching the terminated session identifier could therefore be marked as a candidate tuple for further processing by the buffer manager 333. Additionally, the tuple may have an attribute indicating a time when the tuple should be processed. For example, if the tuple has a time stamp and the tuple must be processed within a certain amount of time, then the buffer manager 333 could eliminate the tuple if it is past the time threshold. At step 630, the buffer manager 333 determines that the predetermined condition is satisfied upon determining that processing of the candidate tuple will produce a known result. For example, if the tuple contains an attribute having a value of zero or one, any multiplication or division based on those values will produce a known result, and will not need to be processed. Therefore, the tuple having such a value may be marked as a candidate tuple, to be further processed by the buffer manager 333. At step 640, the buffer manager 333 determines that the predefined condition is satisfied upon determining that processing of the candidate tuple will produce a result that does not exceed a specified relevance threshold. For example, if the tuple has an attribute containing a value which, when processed by the operator, will not produce a significant result, the tuple can be marked as a candidate tuple. Examples of such relevance threshold include significant digits in arithmetic computations; if an attribute contains 5 significant digits, and the computation would not result in a change in any of those digits, the tuple may be marked as a candidate tuple. The relevance threshold may be defined by the operator properties or by the buffer manager 333.

Figure 7:
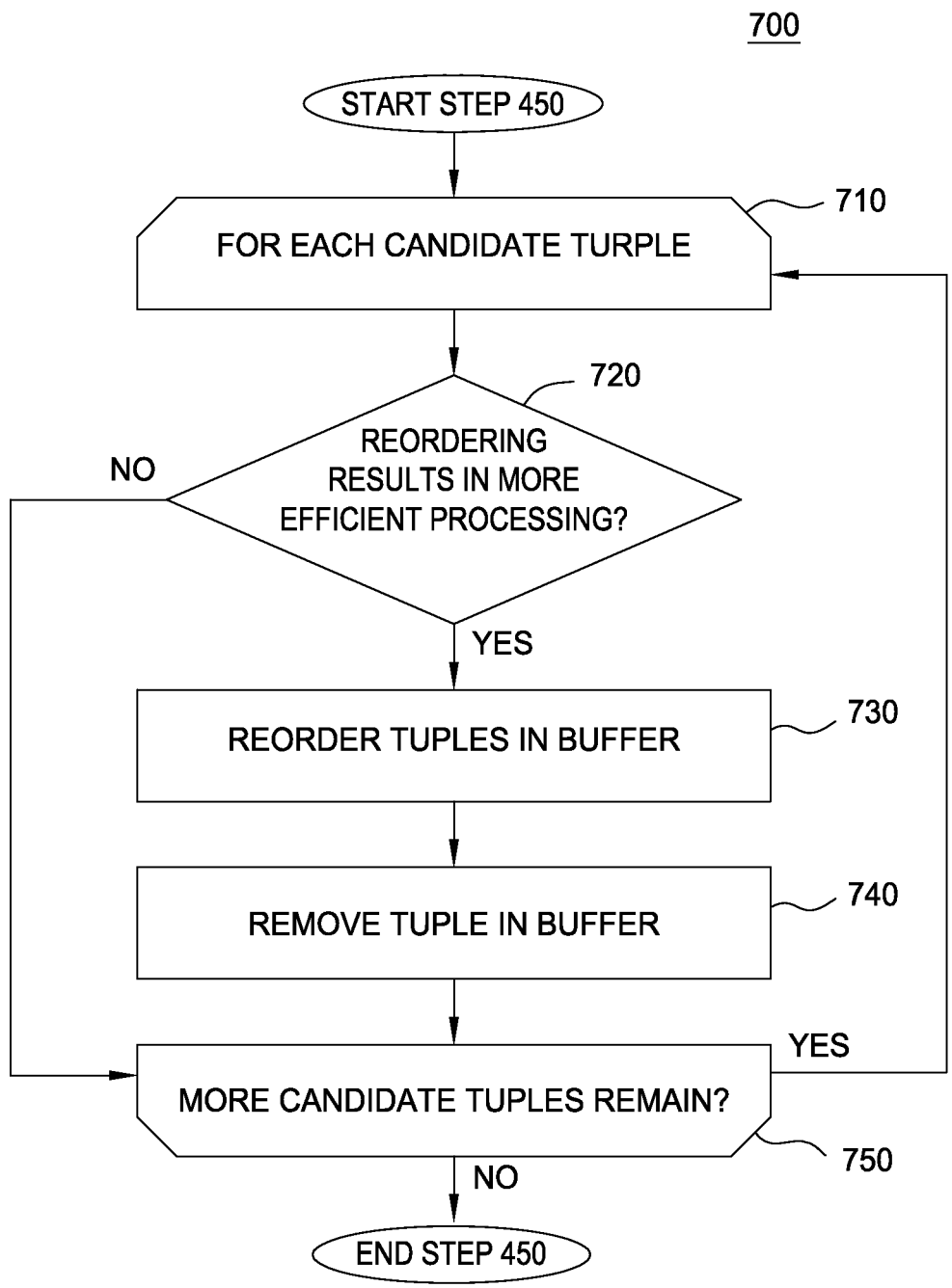
FIG. 7 is a flowchart depicting a method performing an operation to optimize operator processing, according to one embodiment disclosed herein.

FIG. 7 is a flowchart depicting a method 700 corresponding to step 450 for performing an operation to optimize operator processing, according to one embodiment disclosed herein. In some embodiments, the buffer manager 333 performs the steps of the method 700. At step 710, the buffer manager 333 begins executing a loop containing steps 720-750 for each tuple identified as a candidate tuple at step 440. At step 720, the buffer manager 333 determines whether reordering (instead of removing) the buffered tuples may result in more efficient processing in the operator. In some cases, the buffer manager 333 may determine that the tuple may not be removed, but it may be reordered to improve performance. The buffer manager 333 may make this determination based on the observation that grouping like tuples together may result in faster processing. For example, reordering may be beneficial in mathematical computations, where it is more efficient to multiply 5*5*1/3 versus multiplying 1/3*5*5. Additionally, if the buffer manager 333 encounters a termination tuple, it may be more efficient to process the termination tuple first, then all related tuples may be dropped by the buffer manager 333, decreasing the number of tuples requiring processing. If the buffer manager 333 determines that reordering would not result in more efficient operator processing, the buffer manager proceeds to step 740. Otherwise, the buffer manager 333 proceeds to step 730, where the buffer manager 333 reorders the tuples in the buffer 260. The buffer manager 333 may reorder the tuples in the buffer 260 by any criteria, including, but not limited to, grouping tuples having duplicate or similar attributes together, reordering tuples such that the simplest are processed first (while fewer resources are available), or in cases where there is downstream backpressure, processing more resource intensive tuples while waiting for the downstream backpressure to clear. For example, if the buffer manager 333 identifies that tuples have the same values for a session attribute, the buffer manager 333 may determine that the tuples are related to the same user's session, and may group them together to expedite processing. Additionally, if the backlog is the result of downstream backpressure, there may be multiple paths for output data where some are backlogged and others are not. In these embodiments, the tuples could be reordered such that data continues to flow to the paths that are not blocked. At step 740, the buffer manager 333 removes the candidate tuple from the buffer. In some embodiments, the buffer manager 333 may reference operator properties to determine whether the tuple can be removed based on the attributes used to mark the tuple as a candidate tuple.

FIG. 8 illustrates a table 800 depicting the contents of an operator buffer, according to one embodiment described herein. The table generally depicts the contents of a buffer prior and subsequent to the buffer manager 333 performing the methods described above. As shown, element 805 indicates tuples in the operator buffer prior to an operation, with element 820 showing the contents of the operator buffer. Element 810 indicates tuples in the operator buffer after an operation to remove tuples, with element 825 showing the contents of the operator buffer. Element 815 indicates tuples in the operator buffer after an operation to remove tuples, with element 830 showing the contents of the operator buffer. In this example, the application is an online game, and the tuple attributes, listed as PID, Days, PointsEarned, and Active correspond to a player ID number, a number of days played, a number of points earned in the game, and whether the player is active.

As shown in element 805, the tuples in the operator buffer prior to the operation include {PID=100, Days=10, PointsEarned=100.5, Active=1}, {PID=10}, {Days=0, PointsEarned=0, Active=1}, {PID=200, Days=92, PointsEarned=0.001, Active=1}, {PID=102, Days=91, PointsEarned=2, Active=1}, {PID=107, Days=15, PointsEarned=5, Active=0}, {PID=104, Days=5, PointsEarned=3, Active=1}, and {PID=100, Days=10, PointsEarned=100.5, Active=1}. For the purpose of this example, assume that the operator analyzes the data tuple attributes to update player records, such that rewards will be given to players, weighted by the number of days played. Assume further that points earned are significant to a tenth of a point, and that the operator only processes tuples for active players. Element 825 indicates the contents of the operator buffer after the buffer manager 333 has removed tuples from the operator buffer. A duplicate tuple for PID=100 has been removed because the buffer manager 333 identified it as a duplicate tuple, and the operator properties specify that PID can be used as an attribute to determine whether a match exists. The tuple for PID=101 has been removed because the attributes for days and points earned equal zero, and any weight factor multiplied by zero (or any point total added by zero), will result in an unchanged value. The tuple for PID=107 has been removed because the player is not active. The tuple for PID=200 has been removed because the player has only earned 0.001 points, which is not significant in the player point system, and will not result in the player point value increasing upon addition.

Element 830 indicates the contents of the operator buffer after the buffer manager 333 has sorted the tuples according to the PID attribute. All tuples found in element 820 remain, but have been sorted according to PID, after the buffer manager 333 has determined that sorting would result in faster processing than removing tuples.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product, comprising:
   a non-transitory computer-readable storage medium having computer-readable program code embodied therewith, the computer-readable program code comprising:
      computer-readable program code configured to provide a plurality of processing elements comprising one or more operators, the operators configured to process streaming data tuples;
      computer-readable program code configured to establish an operator graph of a plurality of operators, the operator graph defining at least one execution path in which a first operator of the plurality of operators is configured to receive data tuples from at least one upstream operator and transmit data tuples to at least one downstream operator;
      computer-readable program code configured to provide, for each of the plurality of operators, a buffer configured to hold data tuples requiring processing by the respective operator, wherein the buffer is a first-in-first-out buffer;
      computer-readable program code configured to receive, in a first buffer associated with a first operator, a plurality of data tuples comprising at least one attribute;
      computer-readable program code configured to determine that a backlog of data tuples exists in the first buffer;
      computer-readable program code configured to select at least one data tuple from the first buffer;
      computer-readable program code configured to examine at least one attribute of the selected at least one data tuple to identify at least one candidate tuple; and
      computer-readable program code configured to perform a predefined operation on the at least one candidate tuple, the predefined operation comprising:

reordering the at least one candidate tuple based on an attribute value of the at least one candidate tuple; and removing the at least one candidate tuple from the buffer.

2. The computer program product of claim 1, wherein the predefined operation is based on at least one of:

determining that a first candidate tuple is a duplicate of a second data tuple in the first buffer;

determining that processing of the at least one candidate tuple is not necessary;

determining that processing of the at least one candidate tuple will produce a known result; and determining that processing of the at least one tuple will produce a result that does not exceed a specified relevance threshold.

3. The computer program product of claim 1, wherein selecting at least one data tuple comprises one of:

selecting data tuples most recently added to the first buffer;

randomly sampling data tuples in the first buffer;

sampling, based on a predefined algorithm, data tuples in the first buffer; and selecting data tuples based on historical patterns for the first operator.

4. The computer program product of claim 1, wherein the predefined operation reduces the backlog of data tuples in the first buffer.

5. The computer program product of claim 1, wherein the predefined operation is performed upon determining that reordering the at least one candidate tuple results in more efficient processing of the plurality of data tuples in the first buffer.

6. The computer program product of claim 1, wherein reordering the at least one candidate tuple comprises grouping candidate tuples having similar attributes together.

7. The computer program product of claim 1, wherein reordering the at least one candidate tuple comprises:

reordering the at least one candidate tuple in order to process a first candidate tuple, of the at least one candidate tuple, prior to other data tuples in the first buffer, wherein the first candidate tuple requires the least amount of processing relative to other data tuples in the first buffer.

8. The computer program product of claim 1, wherein reordering the at least one candidate tuple comprises:

upon determining that downstream backpressure exists in the operator graph, processing a first candidate tuple, of the at least one candidate tuple, prior to other data tuples in the first buffer, wherein processing the first candidate tuple requires more resources relative to other data tuples in the first buffer.

9. The computer program product of claim 1, wherein reordering the at least one candidate tuple comprises:

upon determining that downstream backpressure exists in a first execution path in the operator graph, processing a first candidate tuple, of the at least one candidate tuple, wherein the first candidate tuple is forwarded, subsequent to processing, on a second data path that does not have downstream backpressure.

10. A system, comprising:

a computer processor; and a memory containing a program, which when executed by the computer processor performs an operation comprising:

providing a plurality of processing elements comprising one or more operators, the operators configured to process streaming data tuples by operation of one or more computer processors;

establishing an operator graph of a plurality of operators, the operator graph defining at least one execution path in which a first operator of the plurality of operators is configured to receive data tuples from at least one upstream operator and transmit data tuples to at least one downstream operator;

providing, for each of the plurality of operators, a buffer configured to hold data tuples requiring processing by the respective operator, wherein the buffer is a first-in-first-out buffer;

receiving, in a first buffer associated with a first operator, a plurality of data tuples comprising at least one attribute;

determining that a backlog of data tuples exists in the first buffer;

selecting at least one data tuple from the first buffer;

examining at least one attribute of the selected at least one data tuple to identify at least one candidate tuple; and performing a first operation on the at least one candidate tuple, the first operation comprising:

reordering the at least one candidate tuple based on an attribute value of the at least one candidate tuple; and removing the at least one candidate tuple from the buffer.

11. The system of claim 10, wherein the first operation is based on at least one of:

determining that a first candidate tuple is a duplicate of a second data tuple in the first buffer;

determining that processing of the at least one candidate tuple is not necessary;

determining that processing of the at least one candidate tuple will produce a known result; and determining that processing of the at least one tuple will produce a result that does not exceed a specified relevance threshold.

12. The system of claim 10, wherein selecting at least one data tuple comprises one of:

selecting data tuples most recently added to the first buffer;

randomly sampling data tuples in the first buffer;

sampling, based on a predefined algorithm, data tuples in the first buffer; and selecting data tuples based on historical patterns for the first operator.

13. The system of claim 10, wherein the first operation reduces the backlog of data tuples in the first buffer.

14. The system of claim 10, wherein the first operation is performed upon determining that reordering the at least one candidate tuple results in more efficient processing of the plurality of data tuples in the first buffer.

15. The system of claim 10, wherein reordering the at least one candidate tuple comprises grouping candidate tuples having similar attributes together.

16. The system of claim 10, wherein reordering the at least one candidate tuple comprises:

reordering the at least one candidate tuple in order to process a first candidate tuple, of the at least one candidate tuple, prior to other data tuples in the first buffer, wherein the first candidate tuple requires the least amount of processing relative to other data tuples in the first buffer.

17. The system of claim 10, wherein reordering the at least one candidate tuple comprises:

upon determining that downstream backpressure exists in the operator graph, processing a first candidate tuple, of the at least one candidate tuple, prior to other data tuples in the first buffer, wherein processing the first candidate tuple requires more resources relative to other data tuples in the first buffer.

18. The system of claim 10, wherein reordering the at least one candidate tuple comprises:
upon determining that downstream backpressure exists in a first execution path in the operator graph, processing a first candidate tuple, of the at least one candidate tuple, wherein the first candidate tuple is forwarded, subsequent to processing, on a second data path that does not have downstream backpressure.

19. The system of claim 10, wherein the first operation is performed upon determining that reordering the at least one candidate tuple results in more efficient processing of the plurality of data tuples in the first buffer.

* * * * *